United States Patent [19]

Klemann et al.

[11] Patent Number: 5,219,604
[45] Date of Patent: Jun. 15, 1993

[54] USE OF ESTER-BRIDGED SIDE CHAINS TO SUPPRESS CALORIC AVAILABILITY OF FAT COMPOUNDS

[75] Inventors: Lawrence P. Klemann, Somerville; John W. Finley, Whippany, both of N.J.

[73] Assignee: Nabisco, Inc., Parsippany, N.J.

[21] Appl. No.: 654,863

[22] Filed: Feb. 13, 1991

[51] Int. Cl.$^5$ ................................................ A23L 1/29
[52] U.S. Cl. .................................... 426/531; 426/601; 426/611; 426/804
[58] Field of Search ................. 426/601, 611, 804, 531

[56] References Cited

U.S. PATENT DOCUMENTS

| | | |
|---|---|---|
| 519,980 | 5/1894 | Winter . |
| 2,962,419 | 11/1960 | Minich ................... 167/81 |
| 3,495,010 | 2/1970 | Fossel ..................... 424/312 |
| 3,579,548 | 5/1971 | Whyte ................... 260/410.7 |
| 3,600,186 | 2/1971 | Mattson et al. ................... 99/1 |
| 3,637,774 | 1/1972 | Babayan et al. ............. 260/410.6 |
| 3,876,794 | 4/1975 | Rennhard ................... 426/152 |
| 4,005,195 | 1/1977 | Jandacek ................... 424/180 |
| 4,304,768 | 12/1981 | Staub et al. ................... 424/180 |
| 4,363,763 | 12/1982 | Peterson ................... 260/410.7 |
| 4,508,746 | 4/1985 | Hamm ..................... 426/601 |
| 4,582,927 | 4/1986 | Fulcher ................... 560/201 |
| 4,797,300 | 1/1989 | Jandacek et al. .............. 426/549 |
| 4,830,787 | 5/1989 | Klemann et al. ................. 260/410 |
| 4,840,815 | 6/1989 | Meyer et al. ................. 426/611 |
| 4,849,242 | 7/1989 | Kershner ................... 426/601 |
| 4,861,613 | 8/1989 | White et al. ................. 426/611 |
| 4,915,974 | 4/1990 | D'Amelia et al. ............... 426/611 |
| 4,925,692 | 5/1990 | Ryan ..................... 426/531 |
| 4,927,659 | 5/1990 | Klemann et al. ............... 426/611 |

FOREIGN PATENT DOCUMENTS

| | | |
|---|---|---|
| 1106681 | 8/1981 | Canada ..................... 99/156 |
| 205273 | 12/1986 | European Pat. Off. . |
| 233856 | 8/1987 | European Pat. Off. . |
| 3529564 | 3/1987 | Fed. Rep. of Germany . |

OTHER PUBLICATIONS

Feuge and Ward, 80 J. Amer. Chem. Soc. pp. 6338-6341 (1958).
Booth and Gross, 40 J. Amer. Oil Chem. Soc. 551-553 (1963).
Feuge and Ward, 37 J. Amer. Oil Chem. Soc. 291-294 (1960).
Goldblatt et al., J. Amer. Chem. Soc. 77: 2477-2479 (1955).
Goodman and Gilman, Pharmalogical Basis of Therapeutics, 7th ed., Macmillan Pub. Co., N.Y., pp. 1002-1003 (1985).
Gottenbos, Chapter 8 in Beare-Rogers, J., ed., Dietary Fat Requirements in Health and Development, A.O.C.S., pp. 107-112 (1988).
Hamm, 49 J. Food Sci. 419-428 (1984).
Hauman, 63 J. Amer. Oil Chem. Soc. 278-288 (1986).
Hess and Messmer, 54B Ber. 499-523 (1921) [full German text and English translation].
LaBarge, 42 Food Tech. 84-90 (1988).
Mead et al., Lipids, Plenum, N.Y., pp. 459-470 (1986).
Shull et al., 38 J. Amer. Oil Chem. Soc. 84-86 (1961).
Stryker, 31 Arch. Path. 670-692 (1941).
Ward et al., 36 J. Amer. Oil Chem. Soc. 667-671 (1959).

*Primary Examiner*—Joseph Golian
*Assistant Examiner*—E. Federman

[57] ABSTRACT

The use of inter- and intra-molecular ester bridges of the formula

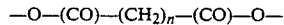

$$-O-(CO)-(CH_2)_n-(CO)-O-$$

where n=1 to 8, between fatty side chains attached to fat compounds is disclosed. These ester bridges, which can be used with both fat mimetics and triglycerides, suppress caloric availability and modulate the functional characteristics of the compounds. Methods of forming and using the bridged structures, and food compositions incorporating them are disclosed.

29 Claims, No Drawings

USE OF ESTER-BRIDGED SIDE CHAINS TO SUPPRESS CALORIC AVAILABILITY OF FAT COMPOUNDS

BACKGROUND OF THE INVENTION

This invention relates to the use of inter- and intra-molecular ester bridges of the formula

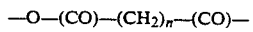

—O—(CO)—(CH$_2$)$_n$—(CO)— where n=1 to 8, between fatty side chains attached to fat compounds of natural and synthetic origin. These ester bridges suppress caloric availability and modulate the functional characteristics of the fat mimetics.

Dietary fat is the most concentrated source of energy of all the nutrients, supplying 9 kcal/gram, about double that contributed by either carbohydrate or protein. The amount of fat in the American diet has increased in the last 60 years by about 25% (Mead, J., et al. Lipids, Plenum, New York, 1986, page 459), so that fats now provide approximately 40% (or more) of the daily caloric intake. Moreover, technological advances in the food industry, including efficient and safe hydrogenation procedures, have changed the kind of fat in foods.

Because fats are high in calories and because some fats appear to pose a health risk when consumed in large quantities over time, a number of national advisory committees on nutrition have made recommendations differing in detail, but the common theme is a reduction in the total amount of fat in the diet (Gottenbos, J. J., chapter 8 in Beare-Rogers, J., ed., *Dietary Fat Requirements in Health and Development*, A.O.C.S. 1988, page 109. Yet fat contributes to the palatability and flavor of food, since most food flavors are fat-soluble, and to the satiety value, since fatty foods remain in the stomach for longer periods of time than do foods containing protein and carbohydrate. Furthermore, fat is a carrier of the fat-soluble vitamins, A, D, E, and K, and the essential fatty acids, which have been shown to be important in growth and in the maintenance of many body functions. Hence, major research efforts have focused on ways to produce food substances that provide the same functional and organoleptic properties as fats, but not the calories.

A number of fat replacements have heretofore been suggested (recently reviewed by Hamm, D. J., 49 *J. Food Sci.* 419–428 (1984), Haumann, B. J., 63 *J. Amer. Oil Chem. Soc.* 278–288 (1986) and LaBarge, R. G., 42 *Food Tech.* 8414 90 (1988)). Hamm divides replacement fats into two broad categories: structurally re-engineered triglycerides modified to retain their conventional functional properties in foods, while removing their susceptibility toward hydrolysis or subsequent absorption during digestion, and materials developed from chemistry unrelated to triglycerides.

Examples of the former class of triglyceride analogues include compounds having the glycerol moiety replaced with alternate polyols (e.g., pentaerythritol in U.S. Pat. No. 2,962,419 to Minich, or sugars, suggested by Hess, K., and Messmer, E., 54B Ber. 499–523 (1921), and patented years later by Mattson and Volpenhein, U.S. Pat. No. 3,600,186, and Meyer, et al., U.S. Pat. No. 4,840,815); compounds having the fatty acids replaced with alternate acids (e.g., branched esters as described in U.S. Pat. No. 3,579,548 to Whyte); compounds having insertions between the glycerol and the fatty acid (e.g., ethoxy or propoxy groups in U.S. Pat. No. 4,861,613 to White and Pollard); compounds having reversed esters (e.g., malonates in U.S. Pat. No. 4,482,927 to Fulcher and trialkoxytricarballylates in U.S. Pat. No. 4,508,746 to Hamm); and compounds having the ester bonds replaced by ether bonds (Can. Pat. No. 1,106,681 to Trost).

Related to triglyceride analogues are dimeric glycerides. Thirty years ago, the U.S.D.A. assessed the caloric availability and digestibility of a series of new-type fats, including dibasic acid-bridged diglycerides (specifically, fumaric, succinic and adipic-bridged diglyceride esters; see Feuge, R. O., and Ward, T. L., 80 *J. Amer. Chem. Soc.* 6338–6341 (1958); Ward, T. L., et al. 36 *J. Amer. Oil Chem. Soc.* 667–671 (1959); Feuge, R. O., and Ward, T. L., 37 *J. Amer. Oil Chem. Soc.* 291–294 (1960); and Shull, R. L., et al. 38 *J. Amer. Oil Chem. Soc.* 84–86 (1961)). Minich suggested ether-bridged dipentaerythritol esters about the same time (U.S. Pat. No. 2,962,419, column 53 to 76), although he exemplified only monomeric pentaerythritol esters.

Examples of Hamm's second category of fat replacements chemically unrelated to triglycerides are mineral oil (suggested as early as 1894 in U.S. Pat. No. 519,980 to Winter); polyglucose and polymaltose (U.S. Pat. No. 3,876,794 to Rennhard); jojoba wax (W. Ger. Pat. No. 3,529,564 to Anika); polyoxyalkylene esters (U.S. Pat. No. 4,849,242 to Kershner); polyvinyl alcohol esters (U.S. Pat. No. 4,915,974 to D'Amelia and Jacklin) and polysiloxane (Eur. Pat. Ap. Pub. No. 205,273 to Frye).

Nondigestible or nonabsorbable edible fat replacements have proved disappointing when tested in feeding trials, where gastrointestinal side effects occurred, in some cases so extreme that frank anal leakage was observed. Nondigestible fats appear to act as a laxative and are expelled from the body, eliciting foreign body reactions like those early documented for mineral oil (Stryker, W. A., 31 *Arch. Path.* 670–692 (1941), more recently summarized in Goodman and Gilman's *Pharmacological Basis of Therapeutics*, 7th ed., Macmillan Pub. Co., N.Y. 1985, pp. 1002–1003). Similarly, experimental fats synthesized by the U.S.D.A group mentioned above exhibited undesirable gastrointestinal side effects when the compounds were fed to rats (Booth, A. N., and Gros, A. T., 40 *J. Amer. Oil Chem. Soc.* 551–553 (1963)); in several of the balance studies, the diarrhea was so extreme that digestibility coefficients could not be calculated ibid., Table I, p. 552).

Polyglycerol and polyglycerol esters, suggested as fat replacements by Babayan and Lehman (U.S. Pat. No. 3,637,774), have been suggested for use as fecal softening agents as well (U.S. Pat. No. 3,495,010 to Fossel). A number of remedies have been recommended to combat the anal leakage observed when sucrose polyesters are ingested (e.g., employing cocoa butters, U.S. Pat. No. 4,005,195 to Jandacek, incorporating saturated fatty groups, Eur. Pat. Ap. No. 233,856 to Bernhardt, or mixing residues, U.S. Pat. No. 4,797,300 to Jandacek, et al.). Saturated fatty acids have been suggested as anti-anal leakage agents for polyorganosiloxane fat replacements (U.S. Pat. No. 4,925,692 to Ryan), and dietary fiber preparations have been incorporated into foodstuffs containing other fat replacements to help inhibit the diarrheal effect (U.S. Pat. No. 4,304,768 to Staub et al.). Partially digestible fat replacements have also been suggested (U.S. pat. Nos. 4,830,787 and 4,927,659 to Klemann and Finley).

SUMMARY OF THE INVENTION

An object of the present invention is to provide a new approach to the design of fat mimetic compounds, and to provide new groups of fat mimetic compounds structurally related to those heretofore suggested. More particularly, it is an object of the present invention to suggest a way of altering the side chains of fat mimetic compounds and triglycerides, to modulate functional characteristics and caloric availability while minimizing laxative side effects.

These and other objects are accomplished by the present invention, which describes the use of inter- and intra-molecular ester bridges of the formula $$-O-(CO)-(CH_2)_n-(CO)-O-$$

where n=1 to 8, between fatty side chains attached to fat compounds. These ester bridges, generally formed by the condensation of fatty side chains bearing hydroxyl groups with dibasic acids or dibasic acid derivatives, can be used with both fat mimetics and triglycerides. Ester-bridging of side chains modulates caloric availability and alter the chemical and physical properties of the compounds.

DETAILED DESCRIPTION OF THE INVENTION

This invention describes a structural modification of previously disclosed edible fat compounds that simultaneously modulates both the caloric availability and functional characteristics of the compounds. This invention describes intra- and inter-molecular ester bridges of the formula $$-O-(CO)-(CH_2)_n 13 (CO)-$$

where n=1 to 8, between fatty side chains of fat compounds.

The compounds of this invention are monomers, dimers, and oligomers (of 3 to 8 subunits) comprising fat compounds having fatty side chains linked together with ester bridges. Any fat compounds comprising a backbone to which are attached fatty side chains (e.g., fatty acid or fatty alcohol residues) are suitable for this invention, including natural or synthetic edible fats heretofore suggested. Examples of fat compounds include, for example, triglycerides, mono- and di-glycerides, diol diesters, polyol polyesters (e.g., sucrose, glucose, and raffinose polyesters), esterified propoxylated or ethoxylated glycerol and the like, neoalkyl esters, polyglycerol esters, polyoxyalkylene esters, polyvinyl alcohol esters, carboxy/carboxylates, polycarboxylic and dicarboxylic acid esters, mono/diglycerides of short-chain dibasic acids, glyceryl ethers, plant sterol esters, jojoba esters, amino acid esters, amides, thio esters, and the like, and mixtures thereof. Neoalkyl esters include, but are not limited to, trishydroxymethyl alkane esters. Triglycerides include, but are not limited to, natural, synthetic and processed (e.g., transesterified, interesterified, partially hydrogenated and fully hydrogenated) triglycerides.

The structural modification of the present invention generally results in two types of side chains on the fat compounds: ester bridged side chains comprising the linkages described above and unbridged side chains comprising pendant fatty groups which have not been modified.

In the practice of the present invention, ester bridged side chains are formed by reacting dibasic carboxylic acids, or dibasic carboxylic acid derivatives, with hydroxyl functions situated on side chains of the fat compounds. By "side chains" are meant, in this context, the aliphatic portions of the fat compounds which contain points of attachment for the dibasic acid bridges such that the portions of the molecules between the points of attachment and the ends of the side chains comprise only carbons and hydrogens.

The hydroxyl groups on the side chains serving as the attachment points for the bridges may be natural constitutents of the side chains, as is the case with ricinoleic acid and ricinoleyl alcohol, glycolic acid, lactic acid, mixtures thereof and the like. Alternatively, fat compounds containing side chain hydroxyl moieties may be derived using common methods of transesterification or interesterification between fat compounds and hydroxycarboxylic acids or hydroxycarboxylic acid derivatives (e.g., methyl lactate and the like). Alternatively, hydroxyl groups may be added to double bonds on fat compound alcohol or acid residues, e.g., to oleyl, oleic, palmitoleyl, palmitoleic, nervonyl, nervonic, and the like, to form hydroxylated derivatives, or prepared from bromo or chloro derivatives by reaction with KOH (as summarized in U.S. Pat. No. 4,363,763 to Peterson, column 5, line 66 to column 6, line 30). Additionally, hydroxyl groups may be attached in the omega position by enzymatic catalysis or other methods known in the art.

Dibasic acids forming the ester bridges have the formula $HO(CO)-(CH_2)_n-(CO)OH$, where n=1 to 8. Thus, the ester bridges may be derived from any dibasic acid in the oxalic acid series having 1 and as many as 8 (n) methylene groups, for example, malonic, succinic, glutaric, adipic, pimelic, suberic, azelaic, and sebacic acids. The bridges are formed by reacting either the dibasic acids, or dibasic acid derivatives (e.g., chlorides or anhydrides), with hydroxyl groups on the fatty side chains of fat compounds.

Attachment of the dibasic acids to the side chain hydroxyl groups result in intramolecular or intermolecular ester bridges. By "intramolecular" is meant pertaining to different parts of the same molecule, and applies to monomeric fat compounds having ester bridges between side chains. By "intermolecular" is meant pertaining to more than one molecule, and applies to dimeric or oligomeric fat derivatives having ester bridges between side chains on different fat compounds. As used herein, "oligomeric" means comprising 3 to 8 subunits. Thus, intermolecular ester bridges of this invention may join trimers, tetramers, pentamers, hexamers, heptamers and octamers.

The ratio of bridged side chains to unbridged side chains in the compounds is generally on the order of 25 to 70 mole per cent, more narrowly 25 to 50 mole per cent, even more narrowly 30 to 35 mole per cent. Thus, one embodiment of this invention comprises bridging one side chain of a fat compound having three side chains to another side chain of a fat compound having three side chains to yield an intermolecular bridge; in the bridged structure, two side chains are bridged and four are unbridged, yielding a molar ratio of 1 to 3 (or ~33.3%). In another embodiment, one side chain of a fat compound having three side chains is bridged to another side chain of a fat compound having four side chains to yield an intermolecular bridge spanning two side chains and five unbridged side chains in the resulting structure, which corresponds to a molar ratio of bridged to unbridged side chains of 2 to 5 (or 40%). In yet another embodiment, one side chain of a fat compound having three side chains is bridged to another side chain of a fat compound having two side chains to yield an intermolecular bridge spanning two side chains and three unbridged side chains in the resulting structure, which corresponds to a molar ratio of bridged to unbridged side chains of 2 to 3 (or ~66.7%).

Unbridged fatty side chains are generally of two major types. The first are fatty acid residues derived from natural or synthetic fatty acids of the formula RCOOH, where R is an aliphatic group having 1 to 30 carbons. R aliphatic groups may be linear or branched, saturated or unsaturated. Examples of fatty acids are acetic, propionic, butyric, caproic, caprylic, pelargonic, capric, undecanoic, lauric, myristic, palmitic, stearic, arachidic, behenic, erucic, brassidic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, docosahexaenoic, and the like acids.

Mixtures of fatty acids may also be used, such as those obtained from the hydrolysis of non-hydrogenated, partially hydrogenated or fully hydrogenated soybean, safflower, sunflower, sesame, peanut, corn, olive, rice bran, canola, babassu nut, coconut, palm, palm kernel, lupin, nasturtium seed, mustard seed, cottonseed, low erucic rapeseed, dairy butter or marine oils. Fatty acids derived from other fats, such as tallow or lard, or plant waxes such as jojoba may be employed. Specific fractions of natural or processed oils, fats or waxes may also be used.

The second type of unbridged fatty side chains include fatty alcohol residues derived from synthetic or natural fatty alcohols of the formula $RCH_2OH$, with R a linear or branched, saturated or unsaturated aliphatic group having 1 to 30 carbons. Examples of fatty alcohols include the counterparts to the fatty acids listed above, namely, ethyl, propyl, butyl, hexyl, caprylyl, pelargonyl, capryl, lauryl, undecanyl, myristyl, palmityl, stearyl, arachidyl, behenyl, erucyl, brassidyl, lignoceryl, cerotyl, montanyl, melissyl, palmitoleyl, oleyl, vaccenyl, linoleyl, linolenyl, eleostearyl, arachidyl, nervonyl, eicosapaentanyl, docosatetraenoyl, docosapentaenyl, or docosahexaenyl alcohols. Mixtures of fatty alcohols may also be employed, including those obtained from the processed or unprocessed natural oils, fats or waxes enumerated above, or specific fractions of the oils, fats or waxes.

The side chains and the bridges will be selected to provide a discernible fatty character in the compounds. Thus, most of the R groups have 2 to 4 or more carbon atoms with a percentage containing 4 to 24, more narrowly 10 to 20, and even more narrowly, 14 to 18 carbon atoms. Preferred bridged fat compounds can have an array of R groups selected to include 95% derived from saturated and unsaturated acids having 14 to 18 carbon atoms. In one embodiment, the R should be predominantly saturated and derived from $C_{14}$ to $C_{18}$ acids and alcohols. In another embodiment, the R should be predominantly derived from unsaturated $C_{16}$ to $C_{18}$ acids and alcohols (with a preponderance of monounsaturated groups).

The choice, number and arrangement of R groups on the side chain-linked derivatives and the backbones will affect the biological as well as physical properties of the compounds. Where, by virtue of any of these factors, fatty groups are metabolized, the caloric value of the compound will increase. Where an R group is metabolized, it may be a highly desirable or essential fatty acid such as linoleic acid.

Some compounds are partially digestible. By this is meant that the compounds deliver less than 9 kcal/gram, preferably less than 5, and, in some embodiments, less than 3 kcal/gram, upon being metabolized.

The fat compounds of this invention may be incorporated either alone, or in combination with another fat and/or fat mimetic, into any food composition comprising fat and nonfat ingredients, or used in conjunction with any edible material. Other fats include natural triglycerides rich in highly desirable or essential fatty acids, such as oleic, linoleic, linolenic, or eicosapentaenoic acid, triglycerides bearing fatty acids having beneficial attributes such as those associated with conjugated linoleic acid isomers, medium chain triglycerides and the like. Other fat mimetics include any heretofore suggested as edible fat replacements, including, but not limited to, sugar esters, neoalkyl esters, polyglycerol esters, malonate esters, propoxylated glycerols, retrofats, monomeric carboxy/carboxylates, and the like. The term "edible material" is broad and includes anything edible, whether or not intended for nutrition, e.g., it can be an additive such as an antioxidant for fats or oils, an anti-spatter agent, an emulsifier, a texture modifier such as a plasticizer for chewing gum, a component for cosmetics, or other minor functional ingredient such as a carrier or diluent for use in flavorings, pharmaceuticals, and the like.

Representative of fat-containing edible materials comprising food ingredients and fat mimetic compounds of this invention in full or partial replacement of the natural or synthetic fat are: frozen desserts, e.g., frozen novelties, sherbet, ice cream, ices, or milk shakes; puddings and pie fillings; margarine and margarine substitutes or blends; flavored bread or biscuit spreads; mayonnaises and mustards; salad dressings; filled dairy products such as filled cream or filled milk; dairy or non-dairy cheese spreads; coffee lighteners, liquid and dried; flavored dips; frying fats and oils; nut products such as peanut butter; reformed and comminuted meats; meat substitutes or extenders; pet foods; whipped toppings; compound coatings; frostings and fillings; cocoa butter replacements or blends; candy, especially fatty candies such as those containing peanut butter or chocolate; chewing gum; breakfast cereals; bakery products, e.g., cakes, breads, rolls, pastries, cookies, biscuits, and savory crackers; mixes or ingredient premixes for any of these; as well as flavor, nutrient, drug or functional additive delivery systems.

The following is a list of representative, but not limiting, examples of fat compounds having side chains which may be linked by the ester bridges of this invention:

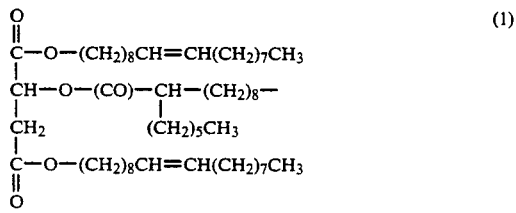
(1)

-continued
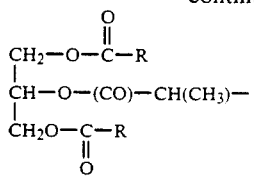
where the R groups are derived from corn oil
(2)
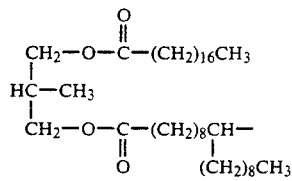 (3)
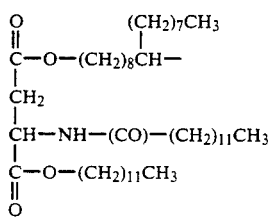 (4)
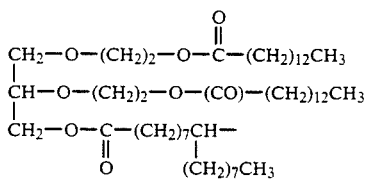 (5)
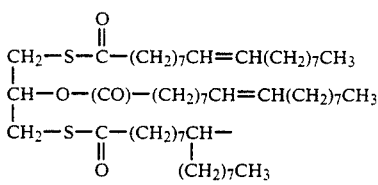 (6)
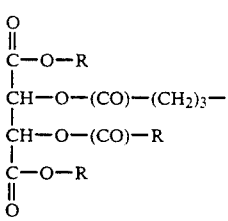 (7)
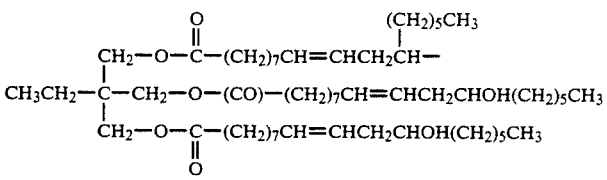 (8)
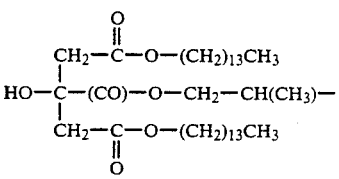 (9)
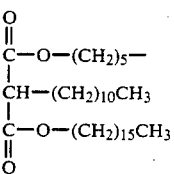 (10)

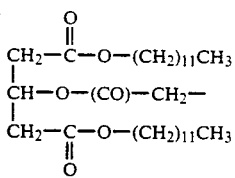
(11)

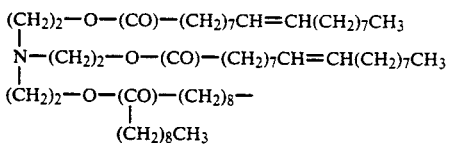
(12)

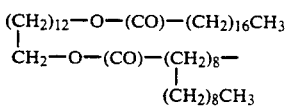
(13)

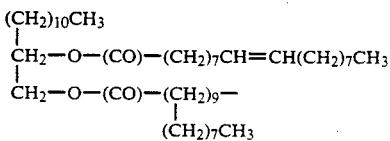
(14)

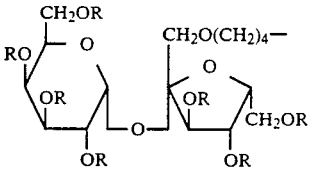
(15)

where R is derived from safflower oil fatty acids

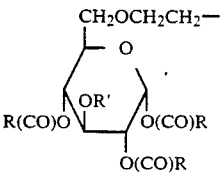
(16)

where R is derived from corn oil fatty acids

EXAMPLES

The following examples are presented to further illustrate and explain the present invention and should not be taken as limiting in any regard. Unless otherwise indicated, all parts and percentages are by weight, and are based on the weight at the particular stage of the processing being described.

EXAMPLE 1

In this example, various adipate linked lactoyl-distearins, side chain ester-bridged compounds of this invention, are prepared in two steps. Adipate linked lactoyl-distearins are 2:1 adducts of lactoyl-distearin with adipoyl chloride, and comprise compounds of the formula

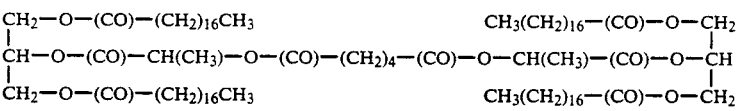

compounds of the formula

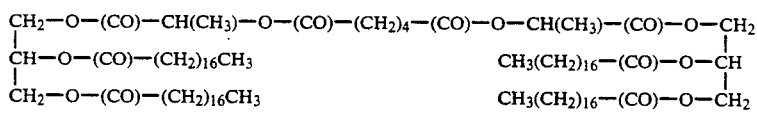

and compounds of the formula

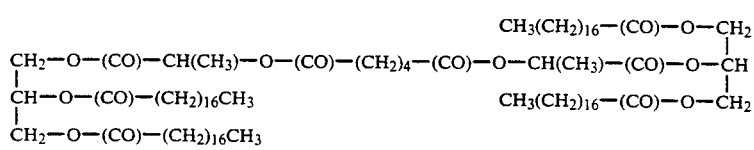

Step 1. Interesterification of tristearin with methyl lactate. Tristearin (447 g, 0.5 mole) is melted in a 1000-mL flask fitted with a mechanical stirrer, reflux condenser, and a gas inlet and outlet. (S)—(—)-Methyl lactate (52 g, 0.5 mole) is added and mixed well, and then followed by 4.0 g of a 10% suspension of sodium methoxide in xylene. The mixture is placed under an atmosphere of dry nitrogen and is stirred for 24 hours at

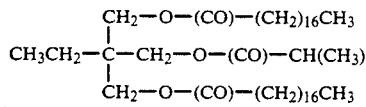 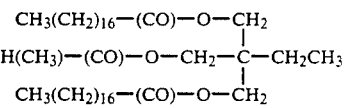

60° C. to complete an interesterification reaction. The reaction mixture is poured into 1000-mL hexane, and this solution is washed with 5% HCl, then water, and is dried over anhydrous sodium sulfate. Evaporation of the solvent and recrystallization of the product from acetone-hexane gives lactoyl-distearin as a mixture of 1,2- and 1,3-distearin isomers.

Step 2. 2:1 Adduct of lactoyl-distearin with adipoyl chloride. A sample of lactoyl-distearin prepared above (139.4 g, 0.2 mole) and 18.3 g (0.1 mole) adipoyl chloride are combined in a 500-mL flask fitted with a magnetic stirrer bar, a thermometer, and a distillation head connected to a vacuum source by means of a trap containing KOH pellets. The mixture is warmed to 70° C., at which point evolution of HCl gas is observed. The temperature is then raised to 115° C. for 7 hours, then the mixture is cooled and poured into 100 mL of 2% NaOH solution. The organic phase is isolated by centifugation, and the crude product is pressure filtered through a shallow bed of absorbent clay. Following vacuum steam deodorization, the 2:1 adduct, bis-(lactoyl-distearin) adipate, is obtained in 81% yield.

EXAMPLE 2

In this example, is-(2-lactoyl-1,3-dipalmitin) sebacate, a side chain ester-bridged compound of this invention described by the formula

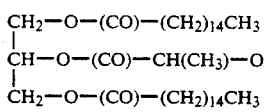 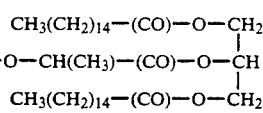

is prepared in two steps. Step 1. 2-Lactoyl-1,3-dipalmitin. The title compound is prepared following the procedures detailed by Goldblatt, L. A., et al., *J. Amer. Chem. Soc.* 77: 2477–2479 (1955).

Step 2. is-(2-lactoyl-1,3-dipalmitin) sebacate. 2-Lactoyl-1,3-dipalmitin (64 g, 0.1 mole) and 12 g (0.05 mole) sebacoyl chloride are combined in a 250-mL flask fitted with a thermometer, magnetic stirrer bar, and a distillation head connected to a vacuum source by means of a trap containing KOH pellets. The mixture is warmed to 115° C. for 7 hours during which time HCl gas is evolved. The crude reaction mixture is allowed to cool and is dissolved in twice its volume of hexane. This solution is passed through a short, silica gel, flash chromatography column. The hexane eluate is concentrated in vacuuo, and the residue is steam deodorized to give the title product.

EXAMPLE 3

This example describes a three-step preparation of another side chain ester-bridged compound of this invention, bis-( 2,2-distearoyloxymethylbut-1-yl lactate) adipate, which may be described by the formula Step 1. 2,2-Di-stearoyloxymethylbutan-1-ol. Stearic acid (284 g, 1.0 mole) and 67 g (0.5 mole) 2,2-di-hydroxymethylbutan-1-ol are combined in a 1000-mL flask fitted with a thermometer, vacuum distillation head, and mechanical stirrer. The mixture is heated at 150 Torr to 140° C. for 16 hours and is then fractionally crystallized from hexane-ethanol to yield a fraction which is 95% of the title diester-alcohol (55% yield).

Step 2. 2,2-Distearoyloxymethylbut-1-yl lactate. The diester-alcohol prepared above (267 g, 0.4 mole) and 43.4 g of an 85% solution of lactic acid in water (0.4 mole lactic acid) are combined in a 1000-mL flask fitted with a thermometer, vacuum distillation head, and mechanical stirrer. The mixture is heated at 150 Torr to 140° C. for 7 hours and is then fractionally crystallized from acetone-water to afford the title triester (93% compositionally pure) in 60% yield.

Step 3. Bis-(2,2-distearoyloxymethylbut-1-yl lactate) adipate. To a solution of 73.9 g (0.1 mole) of the triester prepared in Step 2 above in 200 mL dichloromethane and 20 mL pyridine is added dropwise a solution of 9.15 g (0.05 mole) adipoyl chloride in 50 mL dichloromethane. After the addition is complete, the reaction mixture is stirred at room temperature for 24 hours. The mixture is then poured into 500 mL dichloromethane. After the addition is complete, the reaction mixture is stirred at room temperature for 24 hours. The mixture is then poured into 500 mL of water and is extracted with diethyl ether. The organic phase is washed successivly with 5% HCl, 5% Na$_2$CO$_3$ and water, and is dried over anhydrous sodium sulfate. After filtration, the solvent is removed under reduced pressure, and the residue is dissolved in hexane and passed through a short silica gel column (flash chromatography, hexane eluant). Evaporation of the hexane eluant and steam deodorization of the residue affords the title composition in 68% yield.

EXAMPLE 4

In this example, Bis-(2,2-distearoyloxymethylbut-1-yl) succinate, which may be described by the formula

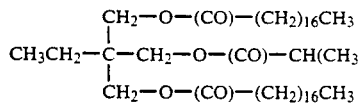
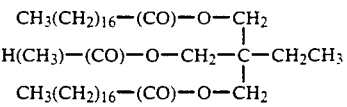

is prepared.

Bis-(2,2-distearoyloxymethylbut-1-yl lactate) succinate. To a solution of 73.9 g (0.1 mole) of the triester prepared in Step 2 of Example 3 above in 200 mL dichloromethane, and 20 mL pyridine, is added dropwise to a solution of 7.75 g (0.05 mole) succinyl chloride in 50 mL dichloromethane. After the addition is complete, the reaction mixture is stirred at room temperature for 16 hours. The mixture is then poured into 500 mL of water and is extracted with diethyl ether. The organic phase is washed successively with 5% HCl, 5% sodium carbonate, and water, and is dried over anhydrous sodium sulfate. After filtration, the solvent is removed under reduced pressure, and the residue is dissolved in hexane and passed through a short silica gel column (flash chromatography, hexane eluant). Evaporation of the hexane eluant and steam deodorization of the residue affords the title composition in 55% yield.

EXAMPLE 5

Italian Dressing. To make Italian dressing, add

| Ingredient | parts |
|---|---|
| Sugar | 4.0 |
| Xanthan Gum | 0.12 |
| Water | 21.5 | at 125°–130° F. and mix three minutes. Then add

| Garlic Vinegar Puree | 1.5 |
|---|---|
| Lemon Juice | 4.0 |
| White Vinegar (120) | 13.0 | and mix three minutes. Add

| Salt | 4.5 |
|---|---|
| Minced Garlic | 0.75 |
| Minced Onion | 0.50 |
| Red Bell Peppers | 0.05 |
| B.I. Spice Blend | 0.08 | and mix three minutes. Fill this aqueous phase 50% by weight with

| Example 2 Ester-Bridged Fat Mimetic | 50.0 |
|---|---| by weight

EXAMPLE 6

Potato Chips. Whole peeled potatoes may be sliced, washed in water, and fried in a 1:1 mixture of Example 1 ester-bridged fat mimetic and peanut oil at 375° F. to desired color. The excess oil is shaken off and the chips are salted. The finished product contains about 35% fat and ester-bridged fat mimetic.

EXAMPLE 7

Margarine; A margarine may be prepared by emulsifying

| Oil Phase Ingredients | parts |
|---|---|
| Example 3 Ester-Bridged Fat Mimetic | 68.6 |
| Liquid Corn Oil | 0.55 |
| Partially Hydrogenated Corn Oil | 0.45 |
| Lecithin | 0.30 |
| Mono- and Di-Glycerides | 0.21 |
| Margarine Flavor and Color | 0.0062 | with

| Aqueous Phase Ingredients | |
|---|---|
| Water | 25.8 |
| Whey | 1.00 |
| Salt | 2.00 |
| Sodium Benzoate | 0.086 |
| Potassium sorbate | 0.066 |
| CaEDTA | 0.0015 | and passing the emulsion through a cool scraped surface heat exchanger in the usual process.

EXAMPLE 8

Puff Pastry Shortening. A puff pastry shortening may be prepared by homogenizing

| Ingredient | parts |
|---|---|
| Fat Mimetic of Example 4 | 68.0 |
| Fat Mimetic of Example 1 | 22.0 |
| Soybean Lecithin | 0.1 |
| Mono- and Diglycerides (0 IV) | 0.2 | with

| Water | 8.2 |
|---|---|
| Salt | 1.5 |

EXAMPLE 9

Cheddar-Style Cheese. To make Cheddar-style cheese, homogenize

| Ingredient | parts |
|---|---|
| Nonfat Milk | 75.0 |
| Low Temperature Nonfat Dry Milk | 4.0 |
| Fat Mimetic of Example 2 | 20.0 |

To this is added

| Salt | 0.7 |
|---|---|
| Lactic Acid Culture | 0.3 |

The mixture is fermented and pressed to a final composition of approximately 37.0% moisture, 63.0% total solids, and 32.0% ester-bridged fat mimetic.

EXAMPLE 10

Process Pimento Cheese Food. Processed pimento cheese food may be prepared by melting

| Ingredient | parts |
| --- | --- |
| Example 9 Cheddar Cheese | 43.0 |
| and Swiss cheese | 44.0. |

Into this is blended

| | |
| --- | --- |
| Dehydrated Pimento | 0 3 |
| and Water | 12.7, | and the mixture is cast into blocks.

EXAMPLE 11

Filled Cream. To make a "filled cream" composition, homogenize about

| Ingredient | parts |
| --- | --- |
| Example 3 Ester-Bridged Fat Mimetic | 30.0 |
| Skim Milk | 69.9 |
| Polysorbate 80 | 0.1 | in a conventional dairy homogenizer.

EXAMPLE 12

Filled Milk. To prepare a "filled milk" composition, combine about

| Ingredient | parts |
| --- | --- |
| Example 12 Filled Cream | 100 |
| Skim Milk | 900 | and rehomogenize.

EXAMPLE 13

Low Calorie Milk. A low calorie "whole milk" may be prepared by combining

| Ingredient | parts |
| --- | --- |
| Nonfat Milk | 96.4 |
| Example 2 Ester-Bridged Fat Mimetic | 3.5 |
| Lecithin | 0.1 | mixing and homogenizing.

EXAMPLE 14

Italian Sausage. To make Italian sausage, chop together

| Ingredient | parts |
| --- | --- |
| Lean Beef | 52.6 |
| Lean Pork | 26.3 |
| Add | |
| Example 1 Ester-Bridged Fat Mimetic Pre-blend | 9.8 |
| Salt | 1.7 |
| Chili Powder | 1.3 |
| Paprika | 0.9 |
| Coriander | 0.01 |
| Nutmeg | 0.01 |
| Ground Caraway | 0.005 |

-continued

| Ingredient | parts |
| --- | --- |
| Celery | 0.005 | and add to meats. Add

| | |
| --- | --- |
| Pimento | 7.37 | with juice and chop until well mixed. Grind through ⅜" plate, stuff into casings and cook at 150° F. for 30 minutes. Smoke and package.

EXAMPLE 15

Vanilla Wafers. Vanilla wafers may be prepared by combining and mixing well

| Ingredient | parts |
| --- | --- |
| Flour | 40.0 |
| Sugar (10×) | 28.0 |
| Example 4 Ester-Bridged Fat Mimetic | 13.0 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 | aerating, and depositing onto a baking surface and baking in the usual manner.

EXAMPLE 16

Sprayed Crackers. A dough prepared from

| Ingredient | parts |
| --- | --- |
| Flour | 100 |
| Sugar | 5.0 |
| Malt | 1.5 |
| Ester-Bridged Fat Mimetic of Example 3 | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28 | is sheeted, stamped, and baked to produce a cracker product, then sprayed with Fat Mimetic of Example 1 prior to packaging.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A food composition comprising fat ingredients and nonfat ingredients, wherein at least a portion of said fat ingredients have fatty side chains bridges by intermolecular ester bridges of the formula

$$-\text{O}-(\text{CO})-(\text{CH}_2)_n-(\text{CO})-\text{O}-$$

where n=1 to 8 formed by the reaction of hydroxyl groups on the fatty side chains with dibasic acids selected from the group consisting of malonic, succinic, glutaric, adipic, pimelic, suberic, azelaic, and sebacic acid.

2. A composition according to claim 1 wherein said fat ingredients are independently selected from the group consisting of triglycerides, mono- and di-glycerides, diol diesters, polyol polyesters, esterified propoxylated and ethoxylated glycerol, neoalkyl esters, polyglycerol esters, polyoxyalkylene esters, polyvinyl alcohol esters, carboxy/carboxylates, polycarboxylic and dicarboxylic acid esters, mono/diglycerides of short-chain dibasic acids, glyceryl ethers, plant sterol esters, jojoba esters, amino acid esters, amides, and thio esters.

3. A composition according to claim 2 wherein said fat ingredients are triglycerides.

4. A composition according to claim 2 wherein said fat ingredients are neoalkyl esters.

5. A composition according to claim 2 wherein said polyol polyesters are selected from the group consisting of sucrose polyesters, glucose polyesters, and raffinose polyesters.

6. A composition according to claim 1 wherein said fatty side chains are selected from the group consisting of fatty acids of the formula RCOOH and fatty alcohols of the formula $RCH_2OH$, where R is an aliphatic group having 1 to 30 carbons.

7. A composition according to claim 1 wherein said fatty side chains are derived from fatty acids having 14 to 18 carbons.

8. A composition according to claim 1 wherein said side chains are derived from acids selected from the group consisting of acetic, propionic, butyric, caproic, caprylic, pelargonic, capric, undecanoic, lauric, myristic, palmitic, stearic, arachidic, behenic, erucic, brassidic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acid, their alcohol counterparts, and mixtures thereof.

9. A composition according to claim 1 wherein said fatty side chains are derived from the hydrolysis of non-hydrogenated, partially hydrogenated or fully hydrogenated oils selected from the group consisting of soybean, safflower, sunflower, sesame, peanut, corn, olive, rice bran, canola, babassu nut, coconut, palm, palm kernel, lupin, nasturtium seed, mustard seed, cottonseed, low erucic rapeseed, dairy butter, and marine oils.

10. A composition according to claim 1 wherein the ratio of unbridged to bridged side chains is 25 to 50%.

11. A composition according to claim 10 wherein the ratio of unbridged to bridged side chains is 30 to 35%.

12. A method of suppressing caloric availability of edible fat and fat mimetic compounds having fatty side chains comprising bridging said side chains with intermolecular ester bridges of formula

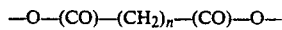

—O—(CO)—(CH$_2$)$_n$—(CO)—O— where n=1 to 8 formed by the reaction of hydroxyl groups on the fatty side chains with dibasic acids selected from the group consisting of malonic, succinic, glutaric, adipic, pimelic, suberic, azelaic, and sebacic acid.

13. A method according to claim 12 wherein said ester bridges are derived from dibasic acids selected from the group consisting of malonic, succinic, glutaric, adipic, pimelic, suberic, azelaic, and sebacic acids.

14. A method according to claim 12 wherein said edible fat and fat mimetic compounds are selected from the group consisting of triglycerides, mono- and di-glycerides, diol diesters, polyol polyesters, esterified propoxylated and thoxylated glycerol, neoalkyl esters, polyglycerol esters, polyoxyalkylene esters, polyvinyl alcohol esters, carboxy/carboxylates, polycarboxylic and dicarboxylic acid esters, mono/diglycerides of short-chain dibasic acids, glyceryl ethers, plant sterol esters, jojoba esters, amino acid esters, amides, and thio esters.

15. A method according to claim 12 wherein said side chains are selected from the group consisting of fatty acids of the formula RCOOH and fatty alcohols of the formula $RCH_2OH$, where R is an aliphatic group having 1 to 30 carbons.

16. A method according to claim 12 wherein said fatty side chains are derived from acids selected from the group consisting of acetic, propionic, butyric, caproic, caprylic, pelargonic, capric, undecanoic, lauric, myristic, palmitic, stearic, arachidic, behenic, erucic, brassidic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acid, their alcohol counterparts, and mixtures thereof.

17. A method according to claim 12 wherein said fatty side chains are derived from the hydrolysis of non-hydrogenated, partially hydrogenated or fully hydrogenated oils selected from the group consisting of soybean, safflower, sunflower, sesame, peanut, corn, olive, rice bran, canola, babassu nut, coconut, palm, palm kernel, lupin, nasturtium seed, mustard seed, cottonseed, low erucic rapeseed, dairy butter, and marine oils.

18. A method of reducing the available calories in a food composition having an edible fat component with fatty side chains bearing hydroxyl groups, which method comprises reacting at least a portion of said hydroxyl groups with an acid of the formula HOOC—(CH$_2$)$_n$—COOH, where n=1 to 8, or an chloride or anhydride derivative of said acid, to form intramolecular or intermolecular ester bridges.

19. A method according to claim 18 wherein said fatty side chains bearing hydroxyl groups are derived from unsaturated acids or alcohols.

20. A method according to claim 18 wherein said fatty side chains bearing hydroxyl groups are selected from the group consisting of ricinoleic acid, ricinoleyl alcohol, glycolic acid, and lactic acid, and mixtures thereof.

21. A method according to claim 18 wherein said ester bridges are derived from dibasic acids selected from the group consisting of malonic, succinic, glutaric, adipic, pimelic, suberic, azelaic, and sebacic acids.

22. A method according to claim 18 wherein said edible fat and fat mimetic compounds are selected from the group consisting of triglycerides, mono- and di-glycerides, diol diesters, polyol polyesters, esterified propoxylated and ethoxylated glycerol, neoalkyl esters, polyglycerol esters, polyoxyalkylene esters, polyvinyl alcohol esters, carboxy/carboxylates, polycarboxylic and dicarboxylic acid esters, mono/diglycerides of short-chain dibasic acids, glyceryl ethers, plant sterol esters, jojoba esters, amino acid esters, amides, and thio esters.

23. A method according to claim 19 wherein said side chains are selected from the group consisting of fatty acids of the formula RCOOH and fatty alcohols of the formula RCH$_2$OH, where R is an aliphatic group having 1 to 30 carbons.

24. A method according to claim 19 wherein said fatty side chains are derived from acids selected from the group consisting of acetic, propionic, butyric, caproic, caprylic, pelargonic, capric, undecanoic, lauric, myristic, palmitic, stearic, arachidic, behenic, erucic, brassidic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acid, their alcohol counterparts, and mixtures thereof.

25. A method according to claim 19 wherein said fatty side chains are derived from the hydrolysis of non-hydrogenated, partially hydrogenated or fully hydrogenated oils selected from the group consisting of soybean, safflower, sunflower, sesame, peanut, corn, olive, rice bran, canola, babassu nut, coconut, palm, palm kernel, lupin, nasturtium seed, mustard seed, cottonseed, low erucic rapeseed, dairy butter, and marine oils.

26. A composition according to claim 2 wherein said fat ingredients are polyol polyesters comprising sucrose polyesters.

27. In a food product having a fat component, an improvement wherein at least a portion of said fat component is at least partially replaced by a dimeric compound comprising the reaction product of a dibasic acid of the formula $$HO-(CO)-(CH_2)_n-(CO)-OH$$

where n=1 to 8, or a dibasic acid derivative, with glycerol or a neoalkyl triol acrylated with two pendant fatty acids and one hydroxy acid.

28. An improvement according to claim 27 wherein said dimeric compound comprises the reaction product of said dibasic acid or dibasic acid derivative with glycerol acylated with lactic acid and two pendant fatty acids.

29. An improvement according to claim 27 wherein said dimeric compound comprises the reaction product of said dibasic acid or dibasic acid derivative with a neoalkyl triol acylated with lactic acid and two pendant fatty acids.

* * * * *